US008926248B2

(12) United States Patent
Guerin et al.

(10) Patent No.: US 8,926,248 B2
(45) Date of Patent: Jan. 6, 2015

(54) FAMILY OF FASTENING ELEMENTS, CHECK GAUGES AND METHOD FOR CONTROLLING THE CHOICE OF THE LENGTH OF A FASTENING ELEMENT

(75) Inventors: Nicolas Guerin, Mery sur Oise (FR); Sebastien Langlais, Tournefeuille (FR)

(73) Assignee: Lisi Aerospace (FR)

( * ) Notice: Subject to any disclaimer, the term of this patent is extended or adjusted under 35 U.S.C. 154(b) by 0 days.

(21) Appl. No.: 13/363,846

(22) Filed: Feb. 1, 2012

(65) Prior Publication Data

US 2012/0213610 A1 Aug. 23, 2012

(30) Foreign Application Priority Data

Feb. 7, 2011 (FR) ................................ FR11 50951

(51) Int. Cl.

| | |
|---|---|
| ***F16B 35/00*** | (2006.01) |
| ***F16B 5/02*** | (2006.01) |
| ***F16B 35/04*** | (2006.01) |
| *F16B 1/00* | (2006.01) |

(52) U.S. Cl.

CPC ................ *F16B 5/02* (2013.01); *F16B 35/044* (2013.01); *F16B 1/0071* (2013.01)

USPC ........................................................ 411/378

(58) Field of Classification Search

CPC .......... F16B 5/02; F16B 19/05; F16B 39/026

USPC .............................................. 411/378, 366.1

See application file for complete search history.

(56) References Cited

U.S. PATENT DOCUMENTS

| | | | | |
|---|---|---|---|---|
| 2,897,867 | A * | 8/1959 | La Torre | 411/281 |
| 2,940,495 | A * | 6/1960 | Wing | 411/305 |
| 4,048,898 | A * | 9/1977 | Salter | 411/44 |
| 4,544,312 | A * | 10/1985 | Stencel | 411/3 |
| 4,874,275 | A * | 10/1989 | Gotman | 411/5 |
| 5,439,339 | A * | 8/1995 | Batchelor | 411/407 |
| 7,025,550 | B2 * | 4/2006 | Monserratt et al. | 411/361 |
| 7,275,903 | B2 * | 10/2007 | Schultz | 411/378 |
| 2009/0297261 | A1 | 12/2009 | Mons | |
| 2012/0237289 | A1 | 9/2012 | Guerin | |
| 2012/0255189 | A1 | 10/2012 | Gaillard | |

FOREIGN PATENT DOCUMENTS

| | | |
|---|---|---|
| EP | 947716 A2 | 10/1999 |
| FR | 2946707 | 6/2009 |
| WO | WO2010/142901 | 12/2010 |

OTHER PUBLICATIONS

Heinzler, Markus; Rapport de Recherche Preliminaire, France INPI, Institut National de la Propriete Industrielle, Jul. 29, 2011.

Heinzler, Markus, Communication with European Search Report, EP12150869, May 2, 2012, 4 pages, EPO.

* cited by examiner

*Primary Examiner* — Flemming Saether

(74) *Attorney, Agent, or Firm* — Henricks, Slavin & Holmes, LLP

(57) ABSTRACT

The invention refers to a family of fastening devices including at least two fastening elements (101, 121), each one of said elements including a shaped end portion (105), a frontal face (106) of the shaped end portion (105) having a cavity (107) extending as far as a bottom (108), the fastening elements having different maximum grips (Gmax), the family being configured so that the distance (109') between the bottom (108) of the cavity (107) and the limit (170) between the body and the shaped end portion is identical for all the fastening elements (101, 121).

Figure 5:
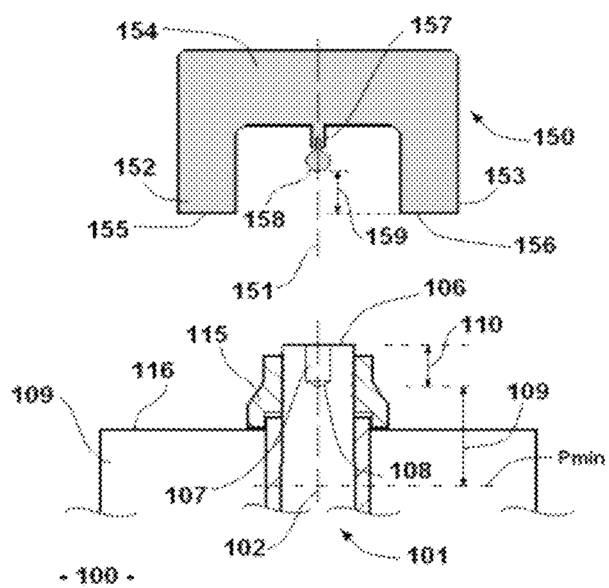

The invention refers moreover to a unit (100) including such a family of fastening devices and a check gauge (150), as well as a method for checking of the choice of the length of a fastening element (101, 121), by means of the check gauge (150).

15 Claims, 4 Drawing Sheets

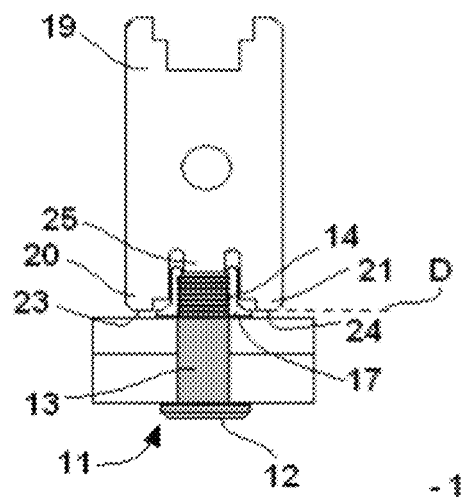
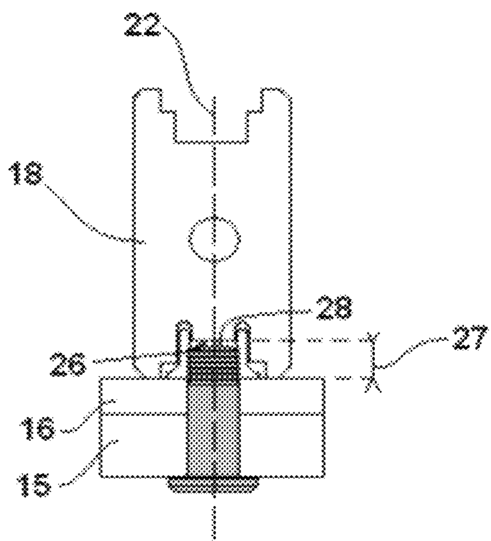
- 10 -
Fig. 1a
Fig. 1b
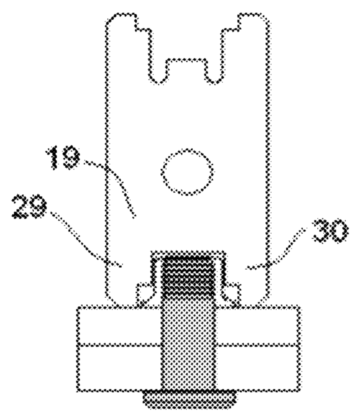
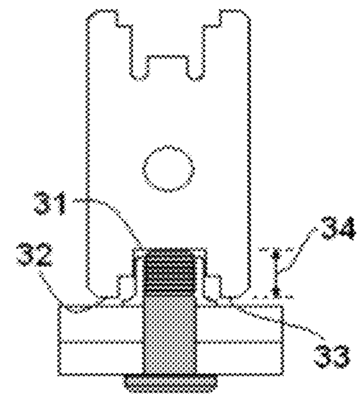
Fig. 2a
Fig. 2b

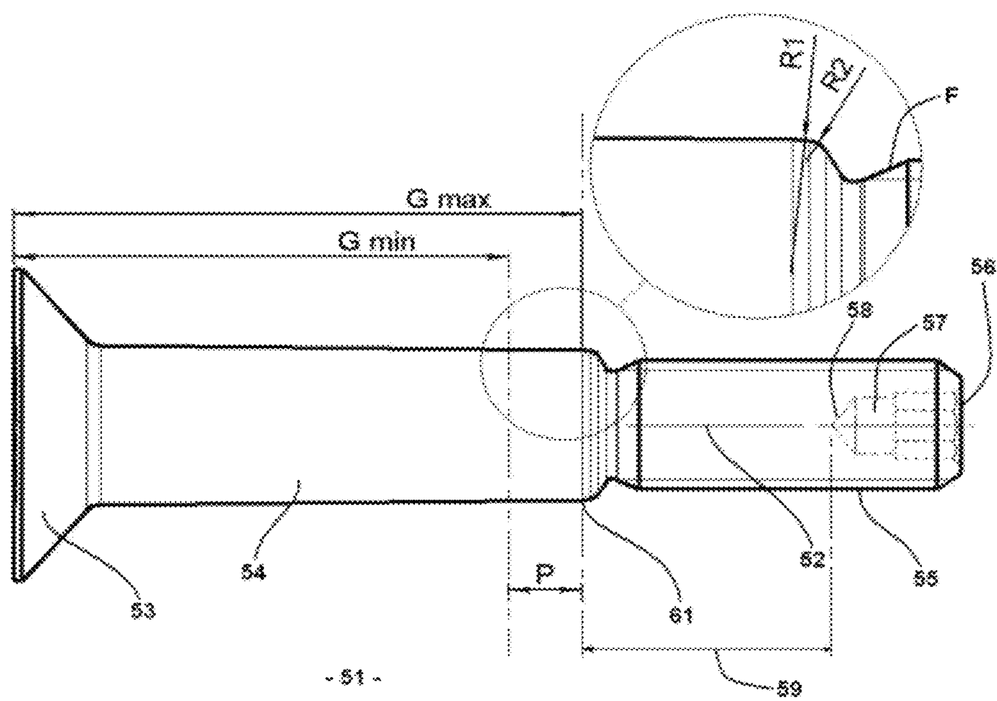
Fig. 3
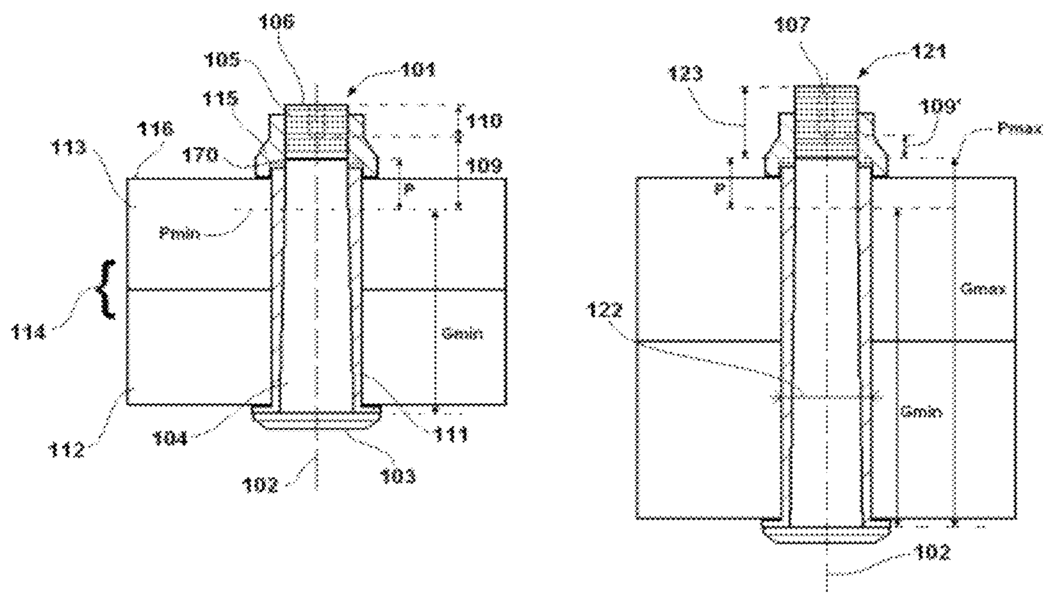
Fig. 4a
Fig. 4b

FAMILY OF FASTENING ELEMENTS, CHECK GAUGES AND METHOD FOR CONTROLLING THE CHOICE OF THE LENGTH OF A FASTENING ELEMENT

The invention refers to a family of fastening devices, as well as a method for installing such a device while checking the choice of the length thereof.

The invention finds a particular application in the field of threaded fastening elements, notably used in the aircraft industry. A traditional threaded fastening device includes a fastening element, such as a pin, said pin comprising a head, a smooth body and a threaded end portion. The fastening device includes moreover a female element, such as a nut, having an internal screw thread able to be tightened on the thread of the pin. The fastening device can also comprise a bush or sleeve, in which the smooth part of the body is inserted.

A difficulty which usually arises is the guarantee to have correctly installed the fastening device on any previously bored structure assembly. A method for installing the fastening device can particularly include the following steps of:

1. choosing the pin with a suitable length before the installation: the checking being performed for example by means of a gauge for measuring the thickness of the structure to be tightened,
2. pre-installing the pin into the bore, while checking that the body (or the sleeve, if the fastening device comprises one) protrudes from the structures to be assembled,
3. checking that the selected pin is not too long compared to the thickness when tightened, because the assembled structure could have been squeezed at the time of the installation.

In this step, it must be checked that the sleeve does not come into contact with the counterbore of the nut if the fastening device includes such a sleeve. Indeed, in the case of an installation in interference with the body of the pin, i.e. without any clearance, the sleeve lengthens a little at the time of this installation into the structure.

For this last checking step, there are check gauges in the form of a plate resting on both sides of the fastening device on an external surface of the structure to be assembled. These gauges comprise in their middle a recess or a particular shape. Such a gauge is represented in FIGS. 1*a*, 1*b*, 2*a* and 2*b*, which will be described later.

Such a gauge notably enables to detect visually that the fastening element is not too long compared to the tightened thickness, by checking that the threaded length remains inferior to a tolerated maximum value of protrusion of the threaded length out of the structure.

This gauge measures a distance between a frontal surface of the threaded end and a surface of the structure. However, when the threads are made by means of a rolling method, the thread end lengthens. The check gauge which rests on the frontal face of a threaded end must then integrate the inaccuracy of the smooth body length and the inaccuracy of the threaded length, which is not very controllable. The total inaccuracy of the measuring system can reach for example +/−0.381 mm.

In the case of a threaded fastening device with a sleeve, the counterbore of the nut must be oversized in order to take into account the inaccuracy of the measuring system and to prevent the sleeve from coming into contact with the counterbore when it is lengthening. A greater inaccuracy of measurement thus imposes to design a higher and therefore heavier nut. However, an increase in weight is to be avoided for devices intended to be used in the aircraft industry.

In addition, the document WO 2010/142901 in the name of the Applicant describes a family of fastening devices, comprising a truncated pin and a sleeve, This family is such that, for the same diameter before the assembly in interference, the sleeves have identical external diameters and different amounts of internal surface taper: the amount of taper for the sleeve depends on the thickness of the structure to be tightened. For a given diameter, the pins can have up to four amounts of taper to cover the thickness ranges for the structure to be tightened and thus have four different threaded lengths.

The use of a usual gauge such as described previously would thus impose to have four different gauges per diameter, that is for example fifty-two gauges for thirteen diameters.

However, putting too great a number of gauges at an operator's disposal would generate the following problems:

- the operator would have difficulty in selecting which gauge to use because the pin length, when indicated, is marked on the pin head whereas checking is performed on the nut side;
- there is a risk in making a wrong choice for the gauge, and thus in rejecting fastening devices that are well installed, or which is worse, in accepting fastening devices that are badly installed;
- a very great number of gauges to be designed and manufactured, which increases the costs accordingly.

An object of the invention is to solve these problems, as well as to improve the precision of the gauge, in order to reject as fewer well-installed fastening devices as possible, while systematically rejecting badly-installed fastening devices. A fastening device is said to be well installed when the female element (nut or collar) installed on the pin (or the rivet) is in contact with the structure and when no contact occurs between the female element and the smooth body, or the sleeve if the fastening device includes one.

For this purpose, the invention refers to a family of fastening devices including at least two fastening elements, each one of said elements extending according to a first axis and including a head, a smooth body and a shaped end portion which are aligned, said shaping of the end portion consisting in providing a thread or swaging grooves, a frontal face of the shaped end portion having a cavity extending parallel to the first axis as far as a bottom. The fastening elements have shaped ends with identical average external diameters, said average diameters being measured in the middle of the thickness of a thread or of the depth of a swaging groove. At least two of the fastening elements have different maximum grip, said maximum grip corresponding to the length of the smooth body according to the first axis between the head and a limit between said body and the shaped end portion. The family is configured so that the distance according to the first axis between the bottom of the cavity and the limit between the body and the shaped end portion is identical for all the fastening elements.

Thus, it is possible to use an identical check gauge for all the elements of the family, in order to check that a fastening element has a length appropriate to the thickness of a structure to be assembled.

In a preferential way, the family of fastening devices includes moreover at least one female element able to be assembled on the shaped end portion of a fastening element by screwing or swaging. The female element can be a nut or a swaging collar.

According to a preferential embodiment of the invention, the family of fastening devices includes at least two fastening elements, each element including a smooth body arranged between the head and the shaped end portion, each one of said bodies being truncated, the family including moreover at least two sleeves having a cylindrical external surface and a truncated internal surface, each internal surface being complementary to a surface of a smooth body of a fastening element, the sleeves having before the interference identical external diameters and different amounts of internal surface taper.

This family of fastening devices is similar to the family described in the document WO 2010/142901.

Preferentially, on the frontal face of the shaped end portion of the fastening elements, the cavity includes a peripheral edge in the form of a multilobed continuous curved line. Such a form, particularly described in the U.S. patent application Ser. No. 13/301,291 in the name of the applicant, enables to apply an important tightening torque by means of a suitable tool. The cavity can thus have a double function of co-operation with an assembly tool and with a check gauge.

The invention also implements a check gauge comprising a male element which cooperates with the cavity located on the shaped end portion of a fastening element of a family according to the invention. it is possible to check the depth of this cavity in a much more precise way than the threaded length because this cavity is machined after rolling the threads or the grooves, and it is made in a controllable way with a precision much higher than that of the rolling the threads or grooves.

The invention also refers to a unit for installing a fastening device, including:

at least one check gauge having substantially a U-shape, including two branches substantially symmetrical relative to a second axis and joined together by a central part, the ends of both branches being coplanar in a plane perpendicular to said second axis, at least one family of fastening devices as described above.

The unit is characterized in that:

the central part of the gauge is integral with a rod able to slide in the cavity of the fastening element, said rod being arranged between both branches of the U, substantially parallel to the second axis, one end of the rod and the plane extending through the ends of the branches being distant by a check distance measured according to said second axis, the check distance is higher than a distance according to the first axis between the bottom of the cavity of the fastening element and the limit between the body and the shaped end portion.

Such a unit allows a more precise design of the gauge. In addition, the cavity made in the fastening element makes it possible to reduce the mass of the latter and of the female element compared to the known devices, which is particularly advantageous in the aeronautical field.

The invention refers moreover to a method for checking the choice of the length of a fastening element, implementing a unit as described above, said method comprising the following steps of:

inserting a fastening element into a bore in a structural unit, so that the head and the shaped end portion of said element are arranged on both sides of said structural unit, assembling the female element with the shaped end portion and tightening the female element against a surface of the structural unit, inserting the rod of the check gauge into the cavity in the shaped end portion, in order to put the end of the rod in contact with a bottom of the cavity, if the end of the rod is in contact with the bottom of the cavity without the ends of both branches of the gauge being able to be in contact with the surface of the structural unit, then the fastening element is too long.

Figure 6A:
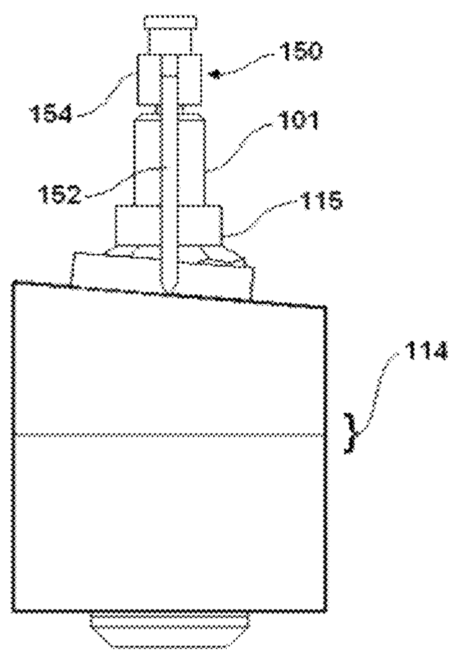
Figure 6B:
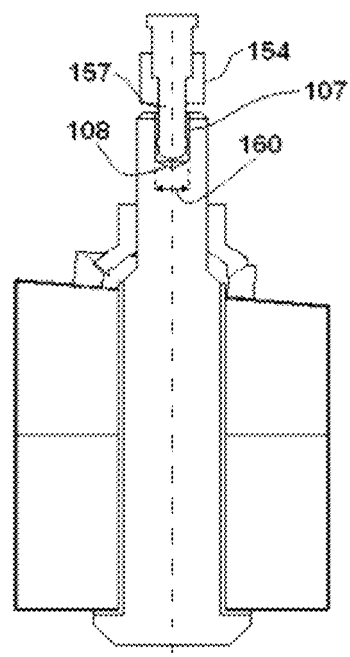
Figures 7A, 7B:
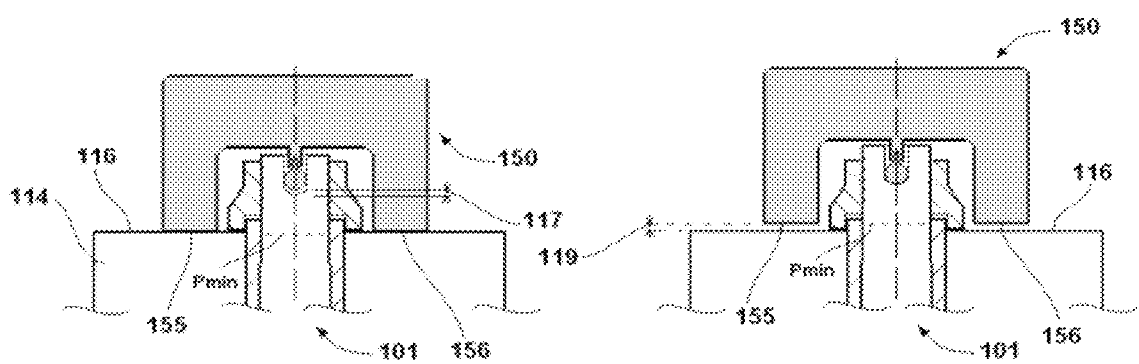

The invention will be better understood when reading the following description and examining the annexed figures. Those are given as an indication and by no means as a limitation of the invention. The figures show:

FIG. 1*a*, 1*b:* sectional views of a unit according to the state of the art for the first checking of the choice of the length of a fastening element installed in a structure;

FIGS. 2*a*, 2*b:* sectional views of a unit according to the state of the art for a second checking of the choice of the length of a fastening element installed in a structure;

FIG. 3: a side view of another fastening element according to the state of the art;

FIGS. 4*a*, 4*b:* sectional views of fastening elements of a family of fastening elements according to an embodiment of the invention;

FIG. 5: a sectional view of elements of a unit for checking the choice of the length of a fastening element according to an embodiment of the invention;

FIGS. 6*a*, 6*b:* sectional views of elements of a unit for checking the choice of the length of a fastening element installed in a sloped structure, according to an embodiment of the invention;

FIGS. 7*a*, 7*b:* sectional views of elements of a unit for checking the choice of the length of a fastening element according to an embodiment of the invention.

FIGS. 1*a* and 1*b* show sectional views of a unit according to the state of the art for checking the choice of the length of a fastening element. The unit 10 includes a substantially cylindrical fastening element 11; said fastening element 11 comprising a head 12, a smooth body 13 and a shaped end portion 14, said shaping consisting here in providing swaging grooves. The fastening element 11 is placed in a bore of a structural unit composed of two structure elements 15, 16. Said structural unit is for example part of an aircraft.

The head 12 is in contact with a first element 15 and the end portion 14 is close to the second structure element 16. A swaging collar 17 is then assembled with the shaped end portion 14 to make the fastening element 11 integral with the structure elements 15, 16.

A check gauge 18 is then used in order to check that the fastening element is neither too short nor too long compared to the thickness of the assembled structure. For this purpose, the gauge 18 comprises a first substantially U-shaped part, including two branches 20, 21 substantially symmetrical relative to an axis 22. A straight regression line D passing through the ends 23, 24 of both branches is perpendicular to the axis 22. This first part checks that the fastening element is not too short.

The U-shaped part of the gauge 18 includes moreover a central rod 25 arranged between both branches 20, 21, substantially coaxially to the axis 22. A plane passing through an end 26 of the pin and a plane passing through the ends 23, 24 of the branches 20, 21 are distant by a distance 27 measured according to the axis 22, chosen as a minimal height of protrusion of the fastening element relative to a thickness of a theoretical assembled structure. The rod 25 is able to slide inside the ring 17 in order to come into contact with a frontal face 28 of the end portion 14.

In FIG. 1*a*, it is shown that the end 26 of the rod 25 is in contact with the face 28 of the element 11, while the ends 23, 24 of the branches of the gauge 18 are not in contact with the structure element 16. The end portion 14 thus protrudes from the element 16 by a distance superior to the distance 27. The fastening element 11 is thus correctly assembled to the structure elements 15, 16.

In FIG. 1*b*, on the contrary, the ends 23, 24 of the branches of the gauge 18 are in contact with the structure element 16 while the end 26 of the pin 25 is not in contact with the face 28 of the element 11. The fastening element 11 does not sufficiently protrude from the structure element 16. The fastening element 11 is thus not correctly assembled to the structure elements 15, 16 since it is too short. It is advisable to dismount the fastening element and to install a new fastening element which is longer.

Another part 19 of the gauge 18 is used to check that the element 11 is not too long compared to the thickness of the assembled structure. This part 19 includes a substantially U-shaped part, including two branches 29, 30 substantially symmetrical relative to the axis 22. A flat median part 31 connects both branches 29, 30. A plane passing through the flat median part 31 and a plane passing through the ends 32, 33 of the branches 29, 30 are distant by a distance 34 measured according to the axis 22, chosen as a maximum height of protrusion of the fastening element compared to a thickness of a theoretical assembled structure.

In FIG. 2*a*, it is shown that the ends 32, 33 of the branches 29, 30 of the gauge 18 are in contact with the structure element 16 while the flat median part 31 is not in contact with the shaped end 14. The length of the fastening element is correct.

In FIG. 2*b*, on the contrary, it is shown that the ends 32, 33 of the branches 29, 30 of the gauge 18 are not in contact with the structure element 16 while the flat median part 31 is in contact with the shaped end 14 of the fastening element. The fastening element 11 is too long and must be dismounted in order to install a shorter element.

FIG. 3 shows a side view of another fastening element 51 according to the state of the art extending according to an axis 52. The element 51 comprises a countersunk head 53, a truncated smooth body 54 and a threaded end portion 55, aligned according to the axis 52, The frontal face 56 of the threaded end portion 55 comprises a cavity 57, arranged parallel to the axis 52 and with a substantially cylindrical shape. This cavity 57 allows maintaining the element 51 immobile in rotation by means of an adapted tool, while a nut is placed on the threaded end portion 55.

The fastening element 51 has a maximum gripGmax, which corresponds to the maximum thickness of a structure that said fastening element can assemble. This maximum grip is represented by the length comprised between the end of the element 51 where the head 53 is located and the limit 61 between the body 54 and the threaded end portion 55. The length Gmax is measured according to the axis 52. If the head 53 were a protuberant head and not a countersunk head, the length of said head would not be taken into account for measuring Gmax.

The junction area between the smooth body 54 and the threaded end portion 55 can be seen in the magnified detail in FIG. 3. The limit 61 coincides with the beginning of a transition area, which connects the smooth body 54 to the first thread F of the threaded end portion 55 through two radii R1 and R2. The fastening element 51 has a grip range P, defined by the manufacturer. The minimum grip Grin, which corresponds to the minimum thickness that a fastening element can assemble, is given by subtracting the grip range P from the maximum grip Gmax.

The bottom 58 of the cavity 57 is located at a distance 59, measured according to axis 52, from the limit 61. The cavity has a depth 60 measured between the bottom 58 of the cavity 57 and the frontal face 56. The depths 60 of the cavities 57 are identical for all the fastening elements of the same type, whatever the external diameter or the length of the element 51.

FIGS. 4*a* and 4*b* show views of fastening elements of a family of fastening elements according to an embodiment of the invention, installed in a structural unit.

More particularly, FIGS. 4*a* and 4*b* show two fastening elements 101, 121 belonging to the same family of fastening devices, respectively. Each element 101, 121 extends according to an axis 102 and comprises a protuberant head 103, a smooth body 104 and a shaped end portion 105, aligned according to the axis 102. In the example represented in FIG. 4*a*, the shaping of the end portion 105 is a thread. The average external diameter of the portion 105 is identical for all the elements of the family, said average diameter being measured in the middle of the thickness of a thread. In addition, the smooth body 104 has an external surface with a truncated shape. The frontal face 106 of the shaped end portion 105 includes an opening into a cavity 107. Said cavity 107, with a substantially cylindrical shape, is arranged parallel to the axis 102, inside the shaped end portion 105.

The fastening element 101 has a maximum grip Gmax. This value corresponds to the length of the smooth body 104, measured according to the axis 102, from the head 103 to a limit 170 with the threaded end portion 105. As the head 103 is protuberant, it is not taken into account for measuring Gmax, The limit 170 coincides with the beginning of a transition area, which connects the smooth body 103 to a first thread of the threaded end portion 105.

The fastening element 101 also has a minimum grip Gmin and a grip range P. The minimum grip corresponds to the minimum thickness of a structure that the fastening element 101 can assemble, If the structure has a thickness lower than Gmin after tightening a female element on the threaded portion 105, then the element 101 is too long for said structure.

The value of Gmin is determined by the manufacturer of the fastening elements (101, 121), according to the mechanical characteristics of said elements. The grip range P corresponds to the difference between Gmax and Gmin.

The expression "maximum grip plane Pmax" designates a plane perpendicular to the axis 102 and passing through the limit 170 between the smooth body 104 and the threaded end 105. The expression "minimum grip plane Pmin" designates a plane parallel to the maximum grip plane, located between said plane and the head 103, both planes Pmax and Pmin being distant from each other by a distance P measured according to the axis 102 and corresponding to the grip range.

The bottom 108 of the cavity 107 is located at distance 109' from the maximum grip plane Pmax, and at a distance 109 from the minimum grip plane Pmin. The difference between the distances 109' and 109 is the grip range P of the fastening element 101. The cavity 107 has a depth 110 measured between the bottom 108 and the frontal face 106. The element 101 is part of a fastening device which includes moreover a sleeve 111. The sleeve 111 has an external cylindrical surface and an internal truncated surface, complementary to the external surface of the body 104. The sleeve 111 is intended to be placed into a bore in structure elements 112, 113 to be assembled, They can be in particular structure elements of an aircraft.

The element 101 is intended to be inserted into the sleeve 111, so that the head 103 and the threaded end portion 105 are on both sides of the structural unit 114 formed by the structure elements 112, 113. A nut 115 is then screwed onto the threaded end 105 and tightened against a surface 116 of the unit 114.

In FIGS. 4*a* and 4*b*, the elements 101 121 are represented in a side view; the sleeve 111, the nut 115 and the structural unit 114 are represented in a sectional view.

In order to fulfill the necessary requirements of mechanical resistance in aeronautics, it is advisable to check, after the installation of the nut, that the latter is suitably installed. It should also be checked that the fastening element is not too long compared to the tightened thickness, or in other words, it should be checked that the tightened thickness is not below this minimum grip Gmin of the selected fastening element. Indeed, too long a fastening element compared to the assembled structure is not correctly installed, either because the nut 115 is not in contact with the surface 116 of the unit 114, or because the end of the sleeve 111 comes into contact with the counterbore of the nut.

FIG. 4*b* shows a fastening element 121 belonging to the same family as the element 101. The description above of the element 101 is applicable to the element 121.

The elements 101, 121 have different lengths between the head 103 and the frontal face 106 of the threaded end, as well as different lengths Gmax and Gmin. In this manner, they can assemble units 114 having different thicknesses.

However, the grip range P, corresponding to (Gmax-Gmin), is the same for all the elements (101, 121) of the same family.

In addition, the sleeves 111 of the elements 101, 121 have identical external diameters 122 and different amounts of internal surface taper. The amount of taper of the sleeve 111 depends on the structure thickness 114 to he tightened. "Amount of taper" means in particular an angle formed by an external surface and an internal surface of the sleeves 111, in the section plane in FIGS. 4*a* and 4*b*.

The elements 101, 121 also have different threaded lengths 123 according to the distance between the head 103 and the frontal face 106. For a given diameter 122, the elements of the type 101, 121 belonging to the same family can have up to four different amounts of taper in order to cover the ranges of the structure thickness 114 to be tightened. The family of elements has thus four different threaded lengths 123.

Consequently, for a fastening element in conformity with the requirements, the elements 101, 121 have different lengths of protrusion from the face 106, relative to the surface 116.

However, as indicated previously, it is preferable to be able to use the same check gauge for checking that the choice of the length of the fastening element remains correct when installed, for the totality of the elements of the same family.

Thus, in order to use only one check gauge for all the family of elements (101, 121) having threaded ends 105 with identical average external diameters, each element 101, 121 is provided with a cavity 107 whose depth 110 is calculated so that the bottom 108 is located at a constant distance 109 from the minimum grip plane Pmin of the fastening element, whatever the length of said element.

As the grip range P of a fastening element is identical for all the elements (101, 121) of the same family, the bottom 108 is also located at a distance 109' from the maximum grip plane Pmax, identical for all the elements of the family. The distance 109' is equal to the distance 109 minus the grip range P.

Thus, elements (101, 121) of the same family having different threaded heights 123 have cavities 107 with different depths 110. The distances from the lower part of the head 103 to the boring bottom 108 (distance Gmin + 109) can be checked very precisely by means of usual check tools, such as a digital ball gauge.

The invention also applies to fastening elements having a body 104 with a cylindrical shape, such elements being able to be associated or not with a sleeve 111, such as for example the rivets or blind rivets.

According to a variant of the invention, the cavity could be a recess arranged parallel to the axis 102 on the external lateral surface of the shaped end portion 105. The cavity also extends from the frontal face 106 over a distance 110 to a bottom 108, with the difference that said distance 110 is selected so that the bottom 108 is situated above the nut or the collar 115 tightened or swaged on the shaped end 105.

FIG. 5 shows a view of a unit 100 including a fastening element 101 such as previously described and a check gauge 150. The element 101 is part of a fastening device including also a nut 115 and a sleeve 111, said device being represented in a sectional view. The gauge 150 is represented in a side view.

The fastening device including the element 101 is installed in a structural unit 114. The function of the gauge 150 is to check the choice of the length of the element 101 after screwing the nut 115, in particular according to the squeeze of the unit 114 during the installation of the fastening device.

The squeeze of the unit 114 is checked relative to the distance 109 between the bottom 108 of the cavity 107 and the minimum grip plane Pmin of the element 101.

The gauge 150 is preferentially symmetrical to an axis 151 or a plane passing through said axis. The gauge 150 is substantially planar and substantially U-shaped, including two branches 152, 153 substantially parallel to the axis 151 and joined together by a central part 154. The ends 155, 156 of both branches are coplanar with a plane perpendicular to the axis 151.

The central part 154 of the gauge 150 is integral with a rod 157, arranged between both branches 152, 153 so that said rod 157 passes through a median plane containing both branches. The rod 157 extends substantially coaxially to the axis 151. The rod 157 is dimensioned so as to be able to slide in the cavity 107 in the fastening element 101, an end 158 of the rod being able to come into contact with a bottom 108 of said cavity.

The end 158 of the rod 157 can have different shapes, such as a cone, a point, a ball or a plate. In a preferential way, the bottom 108 of the cavity 107 has a conical shape and the end 158 of the pin is ball-shaped, said ball-shape being well adapted to come into contact with a boring cone.

The plane perpendicular to the axis 151 passing through the end 158 of the pin and the plane perpendicular to the axis 151 passing through the ends 155, 156 of the branches 152, 153 are distant by a check distance 159 measured according to the axis 151. The check distance 159 corresponds to a tolerated maximum of a distance 109 between the bottom 108 of the cavity 107 of the element 101 and the minimum grip plane Pmin of the elements 101, 121.

The gauge is symmetrical to the axis 151 when the cavity is a recess in the shaped end portion 105, as in the example represented in FIG. 5. According to a variant, the rod 157 could be shifted towards a branch 152 or 153 if the cavity were a recess on an external lateral surface of the shaped end portion 105. According to another variant, the gauge could comprise only one branch if it were only used to check fastening devices installed in flat elements, having external surfaces parallel to each other.

The check distance 159 can be adjusted in a very precise way at the time of the manufacture of the gauge 150. For example, the ball-shaped end 158 is assembled on the central part 154 of the gauge, then the branches 152, 153 are rectified and adjusted, in particular by grinding, so that the ends 155, 156 are at the desired distance 159 from the end 158 of the rod 157.

FIG. 6*a* shows another embodiment of the invention, when the structural unit 114 has surfaces which are not parallel to each other. More precisely, FIG. 6*a* is a side view of a gauge 150 used to check the installation of a fastening device as described previously, including a cavity 107 having the shape of a cylindrical bore in a fastening element 101. The element 101 is installed in a structural unit 114 having surfaces which are not parallel to each other. More precisely, the surface 116 in contact with the female element 115 is not perpendicular to the axis of the element 101. FIG. 6*b* is a sectional view corresponding to the view 6*a*. In both figures, the female element 115 is a self-aligning nut.

To make sure that the central rod 157 is correctly guided in the cavity 107, the rod must have a diameter 160 identical to the cylindrical bore diameter of the cavity 107—except for the clearance, for example between 0.01 mm and 0.03 mm—over a sufficient guiding height. This height is for example equal to the greatest depth 110 of the cavity 107 in the longest fastening element (101, 121) of the family, In this manner, the central rod does not have any sufficient clearance allowing it to tilt in the cavity 107. Such a tilting could lead to errors of measurement.

Generally, the central rod 157 must have a shape complementary to that of the cavity 107 so as to be guided in the latter with a minimum clearance. Thus, a cavity 107 having the shape of a groove on a lateral external surface of the shaped end portion 105 will require a central rod 157 having a shape complementary to that of the groove.

A method for installing a fastening device, implementing a unit such as the unit 100, comprises for example the following steps:

Step 1: inserting a fastening element (101, 121) in a bore in a structural unit 114, so that the head 103 and the threaded end 105 of said element are arranged on both sides of said structural unit 114. The operator checks visually that the sleeve 111, or the smooth body 104 if the fastening element does not have a sleeve, protrudes from the structure 114. In this manner, he/she checks visually that the structure thickness to be assembled is not superior to the maximum grip Gmax of the selected fastening element (101, 121). If the sleeve 111 or the smooth body 104 does not protrude from the bore, the fastening element is too short and the operator must choose another longer element.

Step 2: assembling the nut 115 with the threaded end portion 105 and tightening the nut against the surface 116 of the structural unit 114. The invention also applies to fastening elements having swaging grooves on the end 105, the nut 115 being then replaced by a swaging collar.

Step 3: inserting the rod 157 of the check gauge 150 into the cavity 107 in the threaded end portion 105. This step allows checking that, when tightened, the structure thickness to be assembled is not squeezed and is not below the minimum grip Gmin of the fastening element 101, 121. This step thus enables to check that the operator did not choose too long a fastening element.

FIG. 7*a* shows an example of installing the element 101 in which, at step 3, the ends 155, 156 of the branches 152, 153 of the gauge 150 come into contact with the surface 116 whereas a clearance 117, positive or null, exists between the end 158 of the rod and the bottom 108.

In this case, the total thickness of the unit 114 is superior to the minimum grip Gmin of the element 101. In other words, the minimum grip plane Pmin passes through the unit 114. The element 101 is not too long and is suitably installed.

On the contrary, FIG. 7*b* shows an example of installing the element 101 in which, at step 3, the end 158 of the pin is in contact with the bottom 108 of the cavity without both ends 155, 156 of the branches of the gauge 150 being in contact with the surface 116. The total thickness of the unit 114 is inferior the minimum grip Gmin of the element. The difference in length between the total thickness of the unit 114 and the minimum grip Gmin is visually identified by the clearance 119 between the gauge 150 and the structural unit 114. Indeed, as the rod 157 comes against the bottom 108 of the cavity 107, the ends 155, 156 of the branches of the gauge pass through the plane Pmin. As the clearance 119 is positive, the element 101 is too long, it is advisable to dismount it and to install a shorter one.

If only one of the two ends of the gauge 150 comes into contact with the structure, then the gauge is badly positioned: that can happen if the structures to be assembled are provided with a slope, as in FIGS. 6*a* and 6*b*. The operator must then turn the gauge 150 around the axis 151 of the central rod 157 so that either the ends 155, 156 of both branches comes into contact with the structure 114, or none of them comes into contact with it. Both cases cannot happen simultaneously since the fastening element is either well installed or badly installed.

It is advantageous to envisage, on the gauge 150, inscriptions of the type TOUCH-GO or NO TOUCH-NO GO at the branches 152, 153, which give the operator an indication of the result to be determined at step 3.

The invention claimed is:

1. Family of fastening devices including at least two fastening elements, each one of said elements extending according to a first axis and including a head, a smooth body and a shaped end portion which are aligned, said shaped end portion consists of a thread or swaging grooves, a frontal face of the shaped end portion having a cavity extending parallel to the first axis as far as a bottom, said at least two fastening elements defining first and second fastening elements having shaped end portions having identical average external diameters, said first and second fastening elements having different maximum grips, said maximum grip corresponding to the length of the smooth body according to the first axis between the head and a boundary between said smooth body and the shaped end portion, said first and second fastening elements in the family being configured so that a depth of the cavity in the first fastening element is different than a depth of the cavity in the second fastening element, and a distance according to the first axis between the bottom of the cavity and the boundary between the smooth body and the shaped end portion of the first fastening element is identical to a distance according to the first axis between the bottom of the cavity and the boundary between the smooth body and the shaped end portion of the second fastening element.

2. Family of fastening devices according to claim 1, including moreover at least one female element able to be assembled onto shaped end portion of a fastening element by screwing or swaging.

3. Family of fastening devices according to claim 1 or claim 2, including moreover at least one sleeve intended to fit around the smooth body of a fastening element.

4. Family of fastening devices according to claim 1 or claim 2, wherein the smooth body is truncated.

5. Family of fastening devices according to claim 4, including moreover at least two sleeves having a cylindrical external surface and a truncated internal surface, each internal surface being complementary to a surface of a smooth body of a fastening element, the sleeves having before an interference identical external diameters and different amounts of internal surface taper.

6. Family of fastening devices according to claim 1 or claim 2, wherein the cavity is a cylindrical bore in the shaped end portion.

7. Family of fastening devices according to claim 6, wherein the cavity has a peripheral edge in the form of a multilobed continuous curved line.

8. Family of fastening devices according to claim 1 or claim 2, wherein the cavity is a recess in an external surface on the shaped end portion(s).

9. Unit for installing a fastening device, including:

at least one check gauge having substantially a U-shape, including two branches substantially symmetrical relative to a second axis and joined together by a central part, the ends of both branches being coplanar in a plane perpendicular to said second axis, at least one family of fastening devices according to claim 1 or claim 2, the unit being characterized in that:

the central part of the gauge is integral with a rod able to slide in the cavity of the fastening element, said rod being arranged between both branches of the U, substantially parallel to the second axis, one end of the rod and the plane extending through the ends of the branches being distant by a check distance measured according to said second axis, the check distance is higher than a distance according to the first axis between the bottom of the cavity and the boundary between the smooth body and the shaped end portion.

10. Unit according to claim 9, wherein the end of the rod is ball-shaped.

11. Unit according to claim 10, wherein the rod has a shape complementary to that of the cavity over a guiding height extending over at least a part of the length of the pin.

12. Unit according to claim 11, wherein the rod has a guiding height equal to the greatest depth of the cavity of the longest fastening element of the family.

13. Method for checking the choice of the length of a fastening element selected from a family of fastening devices according to claim 1, implementing a unit having at least one check gauge having a substantially a U-shape, including two branches substantially symmetrical relative to a second axis and joined together by a central part, the ends of both branches being coplanar in a plane perpendicular to said second axis, the unit being characterized in that:

the central part of the gauge is integral with a rod able to slide in the cavity of the fastening element, said rod being arranged between both branches of the U, substantially parallel to the second axis, one end of the rod and the plane extending through the ends of the branches being distant by a check distance measured according to said second axis, the check distance is higher than a distance according to the first axis between the bottom of the cavity and the boundary between the smooth body and the shaped end portion, said method comprising the following steps of:

providing the family of fastening devices according to claim 1 inserting one of said fastening elements into a bore in a structural unit, so that the head and the shaped end portion of said element are arranged on both sides of said structural unit, assembling the female element on the shaped end portion and tightening the female element against a surface of the structural unit, inserting the rod of the check gauge into the cavity in the shaped end portion, if the end of the rod is in contact with the bottom of the cavity without the ends of both branches of the gauge being able to be in contact with the surface of the structural unit, then the fastening element is too long.

14. The family of claim 1 wherein the at least two fastening elements include at least first and second groups of fastening elements, wherein fastening elements in the first group are identical to each other and fastening elements in the second group are identical to each other, and wherein fastening elements in the first group have maximum grips different than maximum grips of the fastening elements in the second group.

15. The family of claim 1 wherein shaped end portions of the first and second fastening elements have different lengths.

* * * * *